Dec. 12, 1961        G. SLAYTER        3,012,923
FIBROUS PRODUCTS AND METHOD AND APPARATUS FOR PRODUCING SAME
Filed Sept. 30, 1957        3 Sheets-Sheet 1
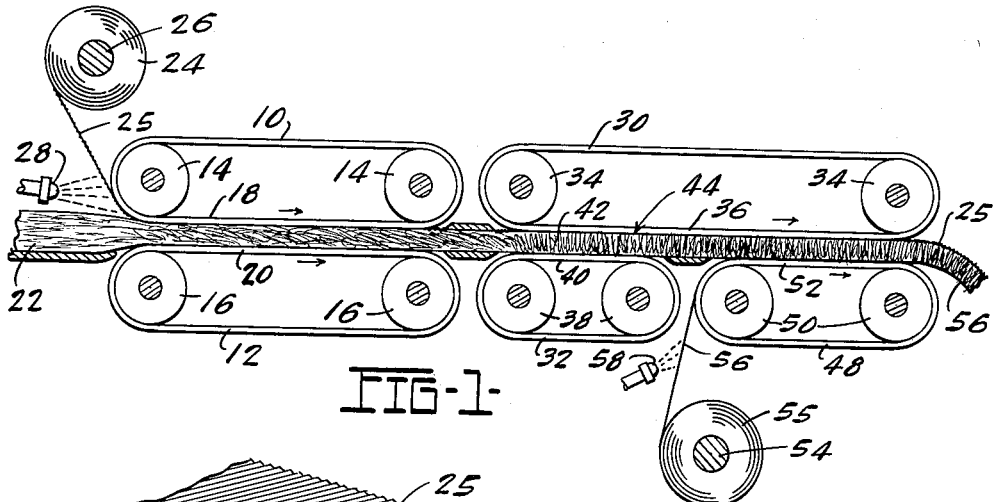
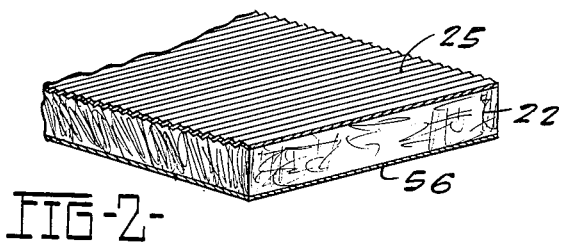
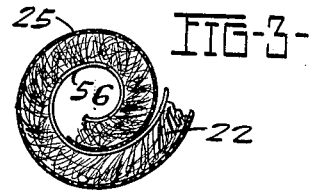
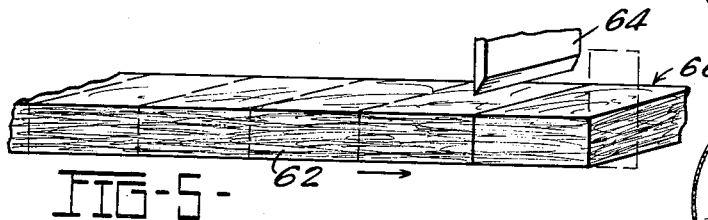
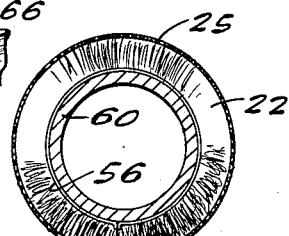
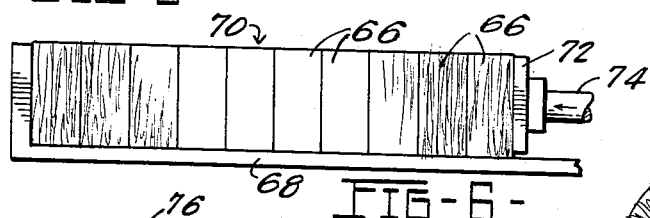
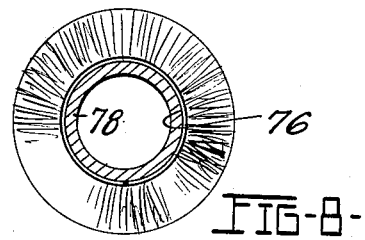
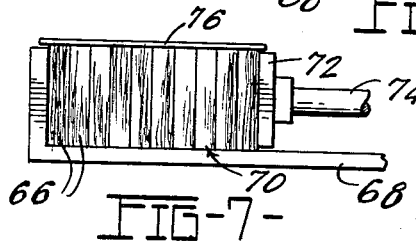
INVENTOR:
GAMES SLAYTER.
BY
ATTYS.

Dec. 12, 1961     G. SLAYTER     3,012,923
FIBROUS PRODUCTS AND METHOD AND APPARATUS FOR PRODUCING SAME
Filed Sept. 30, 1957     3 Sheets-Sheet 2
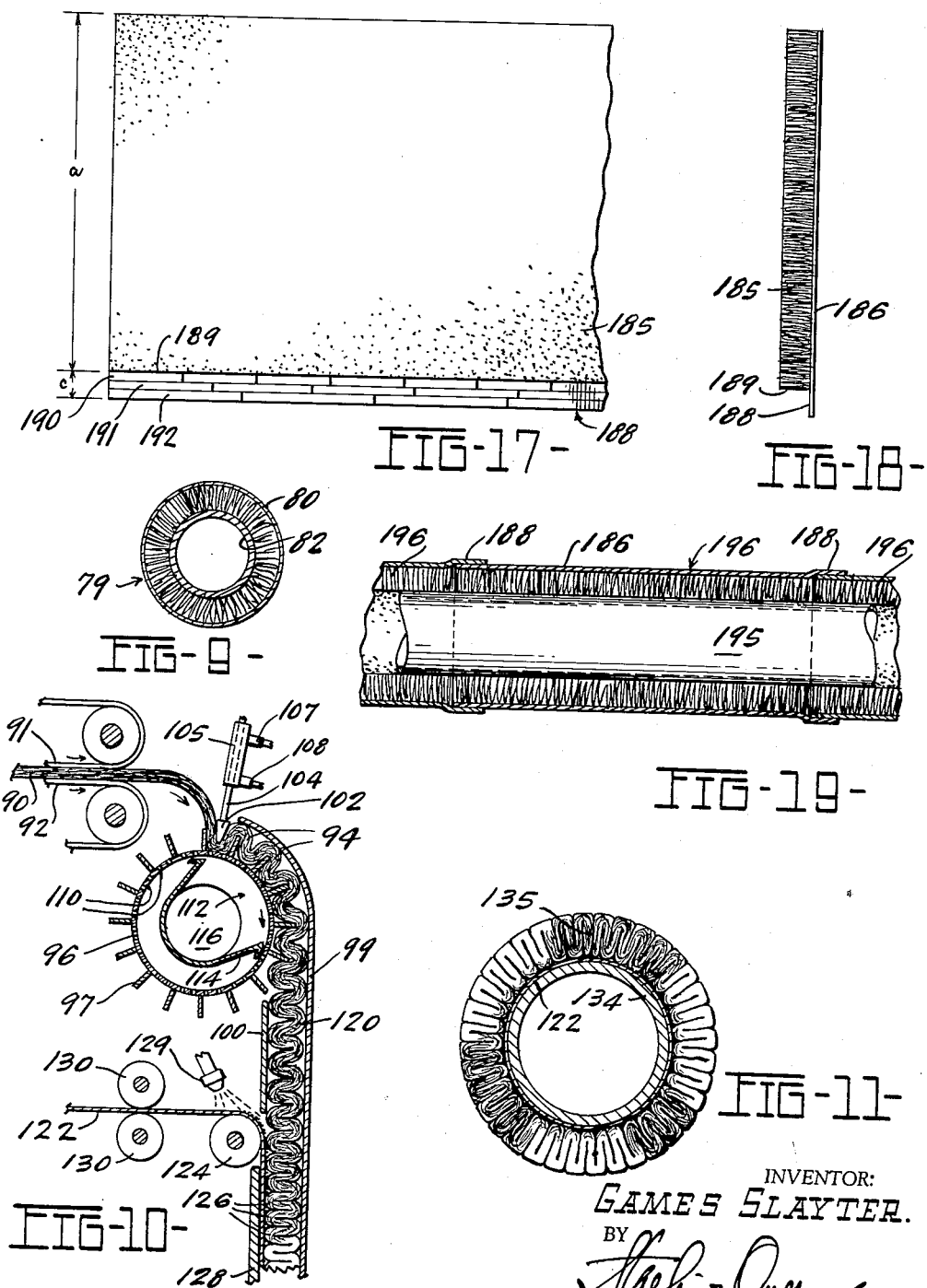
INVENTOR:
GAMES SLAYTER.
BY
ATTYS.

Dec. 12, 1961 G. SLAYTER 3,012,923
FIBROUS PRODUCTS AND METHOD AND APPARATUS FOR PRODUCING SAME
Filed Sept. 30, 1957 3 Sheets-Sheet 3
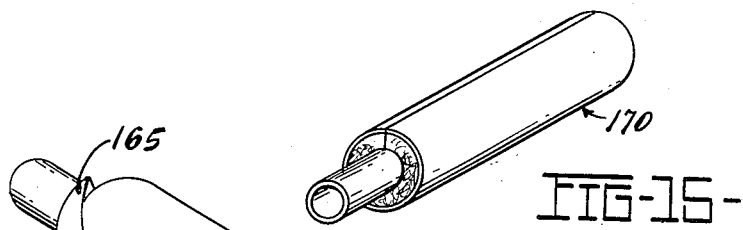
FIG-15-
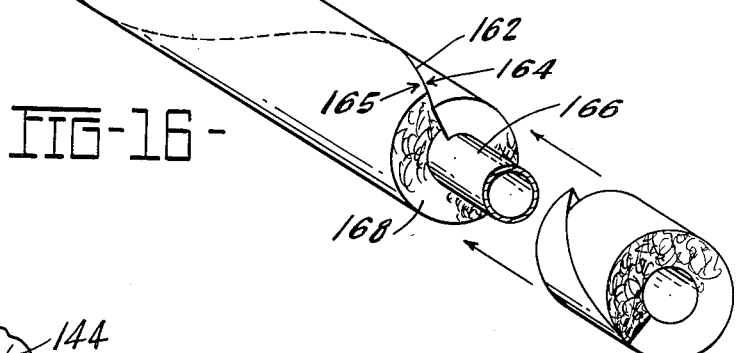
FIG-16-
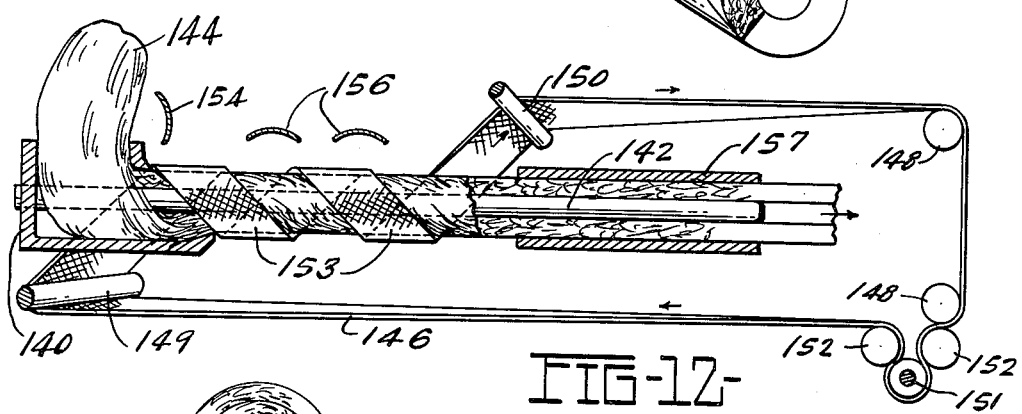
FIG-12-
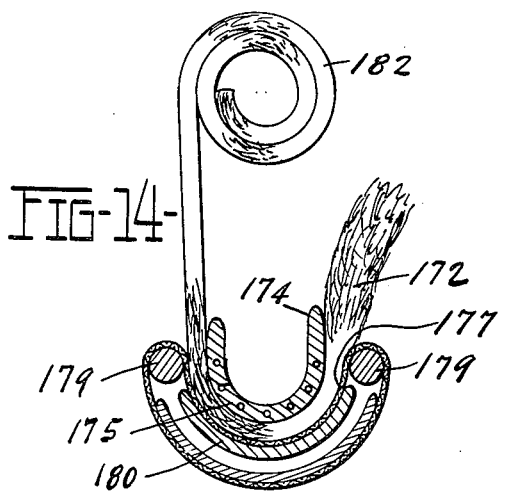
FIG-14-
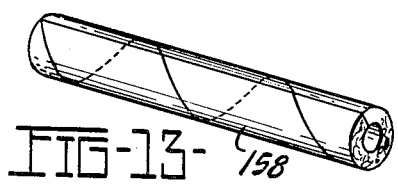
FIG-13-
INVENTOR:
GAMES SLAYTER.
BY
ATTYS.

United States Patent Office 3,012,923
Patented Dec. 12, 1961

3,012,923
FIBROUS PRODUCTS AND METHOD AND APPARATUS FOR PRODUCING SAME
Games Slayter, Newark, Ohio, assignor to Owens-Corning Fiberglas Corporation, a corporation of Delaware
Filed Sept. 30, 1957, Ser. No. 687,122
5 Claims. (Cl. 156—30)

This invention relates to fibrous products and to a method and apparatus for processing fibers to form the products, the invention relating more especially to fibrous pipe covering construction formed of mineral fibers, such as glass fibers or the like.

Fibrous materials have been fashioned into shapes or configurations suitable for covering and insulating pipes or tubes containing heated or cooled fluids. In the fabrication of insulating units heretofore developed for such purposes, the fibrous materials have been preshaped into sections of definite lengths and of semiannular cross-section, two sections being brought into contiguous relation to form a circular cylindrically-shaped insulating body surrounding the pipe or tube to be covered, the complete unit being encased or surrounded by a layer of cloth or other securing medium to retain the two semicylindrically-shaped units together. Insulating units formed of two components of semiannularly-shaped cross-section have heretofore been manufactured by molding operations wherein a binder-laden fibrous mass is disposed between molds or matrices, the fibers compressed in the molds and heat applied to set or cure the binder to integrate the fibers into a mass shaped to the mold configuration.

One method of this character is illustrated in Collins Patent No. 2,288,072, granted June 30, 1942. This method however is comparatively expensive as the operation necessitates the manual placement of a fibrous mass in the molds or dies and, by reason of the curved contours of the mold surfaces, unequal compression stresses are set up resulting in a product which may have zones of varying densities, a condition which impairs the insulating value of the product. Furthermore, the installation of dual section constructions of this character involves the placement of two half sections in contiguous relation surrounding a pipe and applying some means of securing the half sections together. Such method of installation is both time consuming and expensive.

The present invention has for an object the provision of a single integral insulating unit configurated to completely surround a pipe or conduit to be insulated, the fibers of the unit being oriented and stressed to accomplish this purpose.

Another object of the invention is the provision of a fibrous pipe insulating unit preformed and prestressed whereby the unit is caused to assume a rolled configuration so that when a section of the unit is assembled upon a tube or conduit, it resiliently and snugly surrounds the tube or conduit.

Another object of the invention resides in a method of processing a mass of fibers in a manner to impart unequal stresses in the mass whereby the mass is automatically or inherently flexed under the influence of such stresses into a closed cylindrically-shaped unit or is caused to be rolled into a series of close convolutions.

Another object of the invention is the provision of apparatus for performing or carrying out the method of the invention in producing stressed masses of fibers suitable for pipe covering purposes or kindred uses.

A further object of the invention resides in a method of processing the fibers of a mat or mass by reorienting the fibers to improve the structural characteristics and insulating properties of an insulating structure or unit formed from the reoriented fibers.

Another object is the provision of a continuous fibrous mat prestressed in certain regions provided with a layer or membrane of material bearing graduations or measurements indicating the dimension of the mat required to cover or enclose pipe of various sizes in order to facilitate the fabrication of individual pipe covering sections or units from a continuous mat or quantity of the prestressed fibrous mat.

Another object of the invention resides in the method of processing mineral fibers involving the steps of compressing a quantity of fibrous material, bonding the fibers of certain regions of the compressed mass, releasing the forces of compression so that the stressed fibers cause the mass to tend to be rolled into a curved configuration whereby sections of the stressed mass may be snapped onto a pipe or tube to be insulated with the adjacent edge regions of the mat in closed or abutting engagement to completely surround the pipe or tube.

Still another object of the invention is the provision of a method of reorienting the fibers in a mat by successively lapping the mat upon itself and bonding the folds forming a major surface of the lapped construction to a membrane or sheet providing a linear product inherently stressed to assume a rolled up configuration of cylindrical-shape.

Still a further object of the invention is the provision of a method wherein membranes or sheets of material may be applied to opposite major surfaces of a mat or mass of fibers, the membranes being bonded to the fibers while the fibers adjacent the major surfaces of the mass are under differential stresses so as to impart inherent curvature to the end product.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic elevational view of an apparatus for performing steps in the method of applying a membrane to a fibrous mat while the fibers are maintained in a state of compression;

FIGURE 2 is an isometric view illustrating a portion of a mat formed by the apparatus of FIGURE 1;

FIGURE 3 illustrates the rolled condition of the mat under the influence of stressed fibers in certain regions of the mat;

FIGURE 4 is a sectional view illustrating the mat of FIGURE 3 assembled around a pipe or tube;

FIGURE 5 is illustrative of a step in the method of severing and reorienting sections of fibrous mat;

FIGURE 6 illustrates the step of reorienting the severed sections of mat;

FIGURE 7 is illustrative of the sections of fibers in compressed condition with a membrane or layer adhesively joined to the fibers of the compressed sections;

FIGURE 8 is a transverse sectional view illustrating the fibrous unit of FIGURE 7 in expanded form encircling or surrounding a pipe to be insulated thereby;

FIGURE 9 illustrates a modified form of insulation unit formed from the fibrous sections shown in FIGURE 6;

FIGURE 10 is a semidiagrammatic view of an apparatus for corrugating or lapping a fibrous mat and adhesively joining a membrane thereto;

FIGURE 11 is illustrative of a pipe covering unit formed from the product produced by the method illustrated in FIGURE 10;

FIGURE 12 is a semidigrammatic view illustrating an arrangement for spirally forming a fibrous mat into hollow cylindrical or tubular configuration;

FIGURE 13 illustrates a fibrous pipe covering unit formed by the apparatus shown in FIGURE 12;

FIGURE 14 illustrates a modified method of processing a continuous mat of fibers stressed in regions whereby the mat is inherently rolled into convolutions;

FIGURE 15 is an isometric view of a pipe covering section made according to the method shown in FIGURE 14;

FIGURE 16 is an isometric view illustrating the method of accommodating a stressed pipe covering section to fit pipes of various diameters;

FIGURE 17 is a plan view of a continuous mat provided with means indicating severing zones for facilitating cutting the continuous mat into required lengths for different sizes of pipe;

FIGURE 18 is a sectional view of the mat shown in FIGURE 17, and

FIGURE 19 is a schematic view illustrating the method of assembling pipe covering sections formed from the mat shown in FIGURES 17 and 18.

While the method and apparatus disclosed are especially adapted for forming and processing mineral fibers into mats, configurations or shapes usable for covering pipes or tubes, it is to be understood that the method and apparatus may be utilized to form fibrous mats into configurations suitable for insulating wire, cable or other linear bodies.

The invention more especially involves steps in processing masses or mats of mineral fibers, such as glass fibers in a manner reorienting the fibers to improve the insulating properties, and in certain forms of mat, of stressing the fibers in directions to form a normally closed body endowed with a degree of flexibility to enable the body to be opened sufficiently to be snapped onto a pipe or tube to be covered.

FIGURE 1 is illustrative of an apparatus for carrying out steps in a method of producing a fibrous mat or product which during processing is stressed to inherently impart a curved configuration to the mat whereby the same will be automatically rolled into a closed cylindrical-shape or rolled into a series of close convolutions suitable for use in insulating pipe.

The apparatus of FIGURE 1 is inclusive of mat advancing means in the form of a pair of endless belt-type conveyors 10 and 12 supported respectively on sets of rollers 14 and 16, one set of rollers being driven by means (not shown) in a direction to cause the flights 18 and 20 of the conveyors to move in a right-hand direction. A mat or mass 22 of mineral fibers, such as glass fibers, the fibers of which have been formed by conventional methods of attenuating molten glass streams by gaseous blasts, the fibers being collected upon a foraminous conveyor (not shown) moving in a direction to deliver the mass of fibers between the flights 18 and 20 of the conveyors 10 and 12. The fibers of the mat are arranged in directions generally lengthwise of the mat.

Prior to the delivery of the fibrous mass or mat to the conveyors 10 and 12, a suitable binder or adhesive is delivered onto the fibers and the binder cured to lend mass integrity to the mat. The amount of binder delivered onto the fibers is preferably only sufficient to hold the fibers in a mat formation so that the mat of fibers may be readily compressed and, after compressive forces are released, to expand to substantially its initial size.

Various binders may be used, such as thermosettable resins, namely phenolformaldehyde and urea formaldehyde, or thermoplastic resins may be employed. The binder is cured or set prior to entry of the mat between the flights 18 and 20 of the conveyors. The flights 18 and 20 are preferably spaced so as to partially compress the mass or mat of fibers.

Disposed adjacent an end region of the conveyor 10 is a supply roll 24 of crepe paper or crimped material 25 supported on a shaft 26. A suitable binder or adhesive is delivered onto one surface of the paper 25 by means of an applicator 28, and as the paper is advanced from the supply roll 24, the binder-laden surface of the paper engages the upper major surface of the mat and is adhesively joined thereto through the medium of the binder or adhesive.

The binder may be a form of glue or other suitable resin which will bond the paper sheet or strip to the mat. The crimped material or crepe paper 25 is stretched or distended by braking forces effective on the supply roll shaft 26 as the crimped material is applied to the mat of fibers and the binder or glue cured or set while the mat is advanced by the conveyor flights 18 and 20 so that the crimped material in stretched condition is joined to one face of the mat.

Conveyors 30 and 32 are disposed to receive the mat and sheet 25 from the conveyor flights 18 and 20. The conveyor 30 is supported on rolls 34 and is driven by power applied to one of the rolls so that the lower flight 36 moves in a right-hand direction. The conveyor 32 is supported upon rolls 38 and is driven by power applied to one of the rolls to move the upper flight 40 in a right-hand direction.

The conveyors 30 and 32 move at speeds of approximately one-third to one-fourth the speed of the conveyors 10 and 12 in order to compress the fibers of the mat as indicated at 42 and restore the crepe paper or crimped material to its initial crimped condition as indicated at 44. Thus the fibers of the mat, moving at a retarded speed by conveyors 30 and 32 as compared with the speed of the conveyors 10 and 12, are compressed to a substantially high density and the pattern or orientation of the fibers concomitantly modified by the forces of compression so that a major portion of the fibers are rearranged to extend generally transversely of the mat.

Arranged adjacent the right end region of the conveyor 32 is an endless belt conveyor 48 supported upon rollers 50, one of which is driven by suitable means (not shown) to advance the flight 52 of conveyor 50 in a right-hand direction. The conveyor 48 is preferably rotated at the same speed as the conveyors 30 and 32 so as to maintain the fibers in a compressed state and the crepe paper 25 in its crimped condition.

Disposed adjacent the conveyor flight 48 is a shaft 54 supporting a supply roll 55 of foil 56 or other substantially nonstretchable web or sheet material to be delivered into engagement with the lower major surface of the compressed fibrous mat. An applicator 58 is arranged to spray or deliver a suitable binder or adhesive onto one surface of the foil, web or membrane 56 and the adhesive coated surface of the foil engages the lower major surface of the mat and is bonded or adhered thereto by the adhesive. The backing sheet or web 56 may be glass textile or cloth, aluminum or other metal foil, asbestos paper or other substantially nonstretchable material.

As the mat of compressed fibers with the crepe paper and nonstretchable web or sheet bonded thereto leaves the conveyor flights 36 and 52 and the forces of compression thus released, the fibers adjacent the crepe paper or crimped material 25 expand to the limit of stretching the paper taut. The fibers of the mass adjacent the nonstretchable foil or sheet 56 bonded to the opposite face of the mat are maintained in a compressed state by the nonstretchable sheet.

Hence the mat, paper and nonstretchable sheet or web assembly is inherently distorted or flexed to a curved or curled configuration and tends to be wound upon itself in successive convolutions as indicated in FIGURE 3. The fibers of the mat in compressed condition and the crepe paper layer 25 in crimped condition as shown in FIGURE 2 illustrates the relation of the components of the mat assembly as it moves between the conveyor flights 36 and 52 before the fibers adjacent the crepe paper are released to expand to the configuration shown in FIGURE 3 with the mat assembly curled upon itself.

Substantial lengths of the completed mat in curled condition with successive convolutions in close relation may be conveniently transported, the width of the mat construction being of a dimension to form lengths, sections or units suitable for covering pipe. Strips of a width equal to the circumference of the pipe to be covered or insulated may be severed from the roll of mat.

By reason of the stressed condition of the fibers bonded to the foil or strip 56 and the tendency of the remaining fibers to expand, the severed lengths of the mat normally curl into closed tubular shape suitable to be snapped around a pipe. These forces inherently and automatically cause the mat length or section to snugly surround the pipe so that there is no gap at the juncture 59 of the edges of the mat section as shown in FIGURE 4 which illustrates a length or section of the completed mat encircling a pipe 60 for insulating the pipe.

Through this method of forming a pipe covering construction from mineral fibers, the continuous mat construction may be severed transversely into sections of desired width to cover or insulate pipes of various diameters without the use of molds or other expensive equipment heretofore utilized for forming pipe covering units or sections. If desired, pressure sensitive or heat sealing tape may be applied to join the abutting edges of the sections and the ends of adjacent sections when the same are installed upon pipe.

It is preferable that the compressed fibers in the mat lie generally in a direction crosswise of the continuous mat so that in a severed section, the fibers lie generally lengthwise of the severed section. The fibrous component of the pipe covering may be of any density, and a density of from two to five pounds per cubic foot provides satisfactory insulation. A light density mat of a thickness of about four inches may be backed with the crepe paper layer and used for building wall insulation. An insulating mat of this character may be compressed at the time of its manufacture to form a package occupying a comparatively small space for shipping purposes and which will expand to its initial size when the compression forces are released.

FIGURES 5 through 8 illustrate steps in the method of forming a pipe covering construction wherein the mineral fibers are oriented in a different pattern. In the product formed by this method, the fibers lie in directions generally normal to the major faces of the mat structure. The mat 62 shown in FIGURE 5 is advanced in a right-hand direction and the fibers lie in directions generally parallel and lengthwise of the mat.

A binder is delivered onto the fibers during the formation of the mat and the binder cured or set to hold the fibers in an integrated mass. A mat severing means or knife 64 arranged transversely of the advancing mat is periodically or intermittently actuated to sever successive sections 66 from the continuous mat. A group of the severed sections 66 are assembled in abutting relation on a fixture 68 forming an assembly of mat sections wherein the edge regions of the sections form the major surfaces of a reformed mat structure 70 shown in FIGURE 6.

The fibers, which in the continuous mat 62 were disposed lengthwise of the mat, are standing on end in the assemblage as viewed in FIGURE 6. Disposed at the end of the assemblage 70 of mat sections is a reciprocable platen or ram 72 connected with a rod 74 which is associated with an actuating means, such as a fluid actuator (not shown) for compressing the mat sections. FIGURE 7 illustrates the assembly of mat sections 66 in compressed condition.

With the mat sections 66 in compressed condition, an inextensible backing sheet, membrane or member 76 is glued or otherwise bonded to the edge regions of the sections 66 forming one of the major surfaces of the reformed mat structure 70.

The backing sheet may be nonstretchable or inextensible paper, metal foil, textile cloth or other suitable material which is glued or adhesively bonded to the fiber sections 66. The adhesive or bonding material between the mat sections and the sheet 76 is set or cured while the sections 66 are maintained in compressed condition as in FIGURE 7.

The platen 72 is then withdrawn from engagement with the mat sections effecting release of the forces of compression. The fibers of the sections bonded or glued to the backing strip or sheet 76 cannot expand as the strip is inextensible. However the fibers in the other regions of the reformed mat expand and cause the mat to curl into a closed tubular configuration which may be applied to a pipe 78 in the manner shown in FIGURE 8. Through the reorientation of the fibers established by the reassembly of the sections 66 whereby the fibers are disposed lengthwise generally normal to the backing sheet 76, the insulating properties of the mat structure are rendered substantially uniform through the mat structure.

The method exemplified in FIGURES 5 through 8 is especially adaptable for forming pipe covering sections for installation on pipes of various sizes. As the width of the backing strip 76 is made substantially equal to the circumference of the pipe to be covered, pipe covering units may be made to fit various sizes of pipe by simply varying the width of the backing strips 76 and employing the proper number of mat sections 66 so that the assembly of mat sections is compressed substantially to the same extent for different sizes of pipe covering units.

FIGURE 9 illustrates a fibrous product 79 of modified character particularly usable as pipe covering insulation. The construction shown in this figure is formed in the following manner: A group of sections 66 are assembled in the manner illustrated in FIGURE 6. Without compressing the assembled mat sections, a backing strip or sheet 80 is glued or otherwise bonded to the major surface provided by the edge regions of the sections 66.

In this form, the width of the backing sheet 80 is of a dimension to form the outside diameter of the pipe covering unit 79 whereby the backing strip forms the covering for the fibrous component of the unit shown in FIGURE 9 assembled on a pipe 82.

In applying this type of covering on a pipe, the fibers at the unbacked major surface of the mat component directly engage the surface of the pipe, and as the fibers extend in generally radial directions relative to the axis of the pipe, the end regions of the fibers of the sections adjacent the pipe are compacted, thus increasing the density of the fibrous insulation at the region adjacent the pipe 82.

The backing strip 80 may be of a width greater than the width of the mat component so that edge regions of the strip may be overlapped and the overlapping portions cemented or joined together in assembling the unit on a pipe. The backing strip 80 may be formed of muslin, glass cloth, or any web of textile material, and may be cemented or bonded to the fiber sections 66 by magnesium-oxysulfate or other suitable material.

FIGURE 10 is illustrative of steps of a modified method of forming pipe covering sections of the character shown in FIGURE 11. In this method the fibrous mat is folded in a compacted corrugated configuration or pleated pattern wherein the fibers generally extend in radial directions when the covering unit is assembled upon a pipe. With particular reference to FIGURE 10, a preformed mat 90 of mineral fibers bonded to form a flexible mat is advanced by endless belt conveyors 91 and 92 and delivered to a means for pleating or configurating the mat into alternately extending overlapping folds 94.

The apparatus for configurating the folds in the mat is inclusive of a rotatable member or wheel 96 equipped with a plurality of radially extending vanes or bars 97. The rotatable member 96 is preferably of hollow configuration and is journaled for rotation about its axis. Disposed adjacent the rotatable member 96 are mat guiding strips or plates 99 and 100 for guiding the reformed mat away from the mat shaping means 96.

Disposed adjacent the region of delivery of the mat 90 into engagement with the vanes 97 is a forming bar 102 which is arranged for reciprocating movement in a direction radially of the axis of the wheel 96. The bar 102 is supported by a plunger 104 extending into a cylinder 105, the plunger 104 being formed with a piston portion (not shown) reciprocable in the cylinder 105. Fluid pressure, such as compressed air, may be employed to reciprocate the plunger 104 and the bar 102 to press successive regions of the mat into the spaces provided by adjacent vanes 97.

The actuating fluid may be conveyed into and away from the cylinder 105 by means of tubes or pipes 107 and 108. If desired, a suction zone or region of subatmospheric pressure may be established within the rotatable member 96 to assist in retaining the folds or laps of the mat in contact with the periphery of the member 96 to minimize slippage of the laps of the mat by the action of the plunger 104 in forming the folds. The peripheral rim of the wheel 96 is provided with perforations 110 which, during rotation of member 110, are moved into registration with a chamber 112 defined by a sheet metal member 114 disposed within the rotatable member 96.

A tube or duct 116 connects the chamber 112 with a suction blower or other source of reduced pressure to establish suction effective for the above-mentioned purpose. The actuating mechanism for the plunger 104 includes valve means (not shown) coordinated with the rotative movement of the member or wheel 96 so that the bar 102 is moved toward the axis of the wheel 96 and into contact with the mat at a region midway between adjacent vanes, as shown in FIGURE 10, to form a fold in the mat and force the mat into the spaces provided by the vanes.

The wheel or rotatable member 96 is rotated intermittently by conventional step-by-step operating means (not shown) coordinated with the rate of advancement of the mat 90 so that the wheel is in a static position during inward movement of the bar 102 to form a fold in the mat. The conveyors 91 and 92 advance the mat 90 at a speed whereby there is sufficient slack in the mat at its region of engagement with the vanes so that the bar 102 tucks the mat between adjacent vanes without setting up tension in the mat.

It is to be understood that means other than a tucking bar 102 may be employed for forming the folds in the mat. For example, a second wheel or rotatable member equipped with peripheral vanes may be intermeshed with the vanes of the wheel 96 to form the folds through the cooperation of the vanes on both wheels.

The reformed or lapped mat structure 120 is moved between the guide members 99 and 100 toward a region at which the folds or laps are compressed substantially and a backing sheet applied to the successive loops or folds at one side of the mat structure while the laps or folds are maintained in compression. The guide plates 99 and 100 may be spaced relative to the accordion-shaped mat 120 to set up friction at the regions of engagement of the loops of the mat with the guide plates whereby the successive folds or laps are compressed under the action of the rotation of the vanes 97 advancing the mat.

The compression of the folds or laps of the mat may be accomplished by conveyor flights such as those shown in FIGURE 1 disposed at each side of the mat advancing the mat at a speed slower than the movement imparted to the mat by rotation of the vanes 97. A mat compressing conveyor means of this character may be used in lieu of the guide plates 99 and 100. A backing sheet 122 of inextensible material is adapted to be delivered into contact with the loops of the folds or laps of the mat at one side of the mat and is cemented or adhered to the loops of the fibrous mat.

The backing sheet may be asphalted paper, metal foil, cloth, glass textile or other suitable substantially non-stretchable web. A guide roll 124 directs the backing sheet into engagement with the loops 126 of the mat, a backing sheet to hold the same in contact with the loops guide plate 128 being disposed for engagement with the of fibers until the cement or adhesive has been set or cured. An adhesive or binder is sprayed or delivered onto the backing sheet 122 by means of a plurality of applicators or nozzles 129.

The backing sheet is advanced at the desired speed by means of feed rolls 130. The plate or member 128 in engagement with the backing sheet 122 may be heated to set or cure the binder or adhesive if a thermosettable material is employed, or the plate may be cooled to set the binder if a thermoplastic binder is used. An air jet may be used to set the adhesive if an air drying material is employed.

The continuous accordion-shaped mat 120 with the backing sheet adhered thereto may be severed transversely to form individual pipe covering sections or units. When a severed section is discharged from the retaining plates 99 and 128, the fibers in the regions of the folds opposite the regions adhered to the backing sheet expand and cause the section to be formed into closed cylindrically-shaped tubular bodies. As previously mentioned herein in connection with other forms, the inextensible backing sheet 122 does not permit the fibers bonded thereto to expand.

FIGURE 11 illustrates an insulating section produced by the arrangement shown in FIGURE 10 surrounding a pipe 134 wherein the ends of the mat inherently curled about the pipe are in abutting relation indicated by the line 135. A pipe covering section is produced in which the edges of the section will be maintained in closed or abutting relation under the expansive forces of the fibers in those regions of the folds of the mat spaced from the backing sheet 122.

FIGURE 12 illustrates an arrangement for carrying on a modified method of forming one or more layers or mats of mineral fibers into a tubular configuration particularly suited as pipe covering or insulation. As illustrated in FIGURE 12, a frame member 140 supports one end of a mandrel 142. Means is provided for compressing the layer or mat 144 of fibers as the mat is wound about the mandrel. Such means is inclusive of an endless belt 146 supported by rolls 148, 149 and 150, a driving roll 151 and slack take-up rolls 152.

Regions 153 of the conveyor 146 are spiraled about the mandrel 142 and the mat layer 144. The conveyor guide rolls 149 and 150 are angularly disposed with respect to the mandrel 142 so that during movement of the conveyor 146, the spiral regions 153 thereof convey the mat 144 into engagement with the mandrel and cause the mat to be spirally wound upon the mandrel. The mat 144, which may be formed of one or more layers of glass or other mineral fibers, is preferably provided with a heat curing binder or adhesive which may be partially cured by heat from a heat unit 154 as the material is advanced toward the mandrel.

The adhesive or binder is further cured by means of heating units 156 directing heat onto the region of the mat extending around the mandrel. After the spiraled mat on the mandrel is advanced by the convolutions of the conveyor, the mat is moved through an oven or curing zone 157 which completely cures or sets the binder in the compressed fibers. As the tubular mat moves away from the oven 157, one wall may be split longitudinally and the tubular mat severed transversely at spaced zones to form the individual sections 158 shown in FIGURE 13.

The method exemplified in FIGURE 12 or other wrapping method may be employed to form a single or multilayer insulating product in which the fibers are stressed by compression so that the tubular body tends to remain in a closed or tubular condition. Where several layers of fibers are employed, the fibers of the first one-half to one-third of the total thickness of the mat forming the end product are wrapped around the mandrel under sufficient tension to compress the fibers to a desired density. The remaining portions of the mat are preferably wrapped with less tension so that they are well below the density of the previously wrapped fibers. The several layers form an uncured product in which the diameter is substantially oversize. The cylindrical body so formed is then compressed to the desired diameter and the binder on the fibers cured. Through this operation, the fibers in the outer layers are held in compression and when the body is slit lengthwise the severed edges tend to remain in close contact or abutting relation.

The fibrous body fashioned in this manner may be slit in a spiral line to adjust the body to fit around pipes of various sizes. The body may be slit in a spiral path as indicated at 162 in FIGURE 16, the spiral being pitched at an angle of about forty degrees to the axis of the body. When the spirally slit body is utilized to insulate a pipe of a size different than the diameter of the tubular passage initially formed in the insulating body, the regions 164 and 165 of the fibrous body adjacent the spiral slit 162 may be slidably adjusted relative to each other in lengthwise directions so that the interior surfaces of the fibrous body thereof snugly contact the exterior surface of a pipe 166 to be covered as shown in FIGURE 16.

As shown in FIGURE 16, the end regions 168 of the slit body assume the configuration of a spiral or helix and, as the adjacent section when installed is adjusted to the same diameter to fit the pipe 166, the helical surface of the adjacent section coincides exactly with the helical end surface of the first section so that adjacent sections are thus interlocked. This manner of installing sections upon a pipe requires no trimming of squaring of the end regions of the body. By fabricating pipe covering sections in the manner above described, one size of section may be adjusted to cover several sizes of pipe.

FIGURE 14 is illustrative of a modified method of treating a mass or mat of mineral fibers impregnated with a thermosetting binder or adhesive in a manner to cause the processed mat to curl or be rolled upon itself whereby sections severed from the mat are inherently stressed in directions to form tubular insulating bodies adapted to be snapped onto pipe to be insulated as shown at 170 in FIGURE 15.

The mat 172 is fed between shaping means or forming devices and is cured in a manner to stress fibers in certain regions of the mat to result in a natural roll-up characteristic. A member 174 is formed with a semicircular portion 175 and the mat moves around the portion 175 in a manner to compress the fibers of the mat adjacent the portion 175. Arranged concentric with the semiannular surface of portion 175 is an endless belt 177 or other type of conveyor which, in the embodiment illustrated, is supported upon rolls 179, one of which may be driven in order to advance the fibrous mat 172 around the portion 175. A curved guide plate 180 is provided adjacent the region of the conveyor 177 contacting the mat for guiding the conveyor in a circular or curvilinear path concentric with the curved surface of member 175 to maintain the fibrous mat of a uniform thickness and under substantially constant compression. The mat 172, prior to its engagement with the conveyor 177, is comparatively thick, and as the fibers are delivered into the space between the portion 175 and the conveyor 177, they are substantially compressed to a mat of reduced thickness. Electrical heat such as dielectric or high frequency heating may be applied to the region of the mat disposed between the member 175 and the conveyor 177 to set the binder in the mat. By applying heat to one side of the mat, the binder will be cured or set in varying degrees through the thickness, causing the product to assume automatically a rolled-up condition as indicated at 182 as the mat leaves the member 174 and conveyor 177.

Sections of the rolled mat 182 may be severed to the desired width, each forming an insulating unit 170 shown in FIGURE 15, adapted to be snapped on a pipe to be insulated. Due to the stressed condition of the fibers in the severed section, the section will be biased into a closed tubular body encircling the pipe to be insulated. It is to be understood that heat may be applied to both major surfaces of the mat to thoroughly cure or set the binder substantially uniformly throughout the thickness of the mat.

FIGURES 17 and 18 illustrate a continuous mat and backing sheet assembly wherein the backing sheet is provided with rows of graduations or indicia, the graduations being spaced to indicate regions at which the mat assembly may be severed to form individual sections of widths to properly surround pipes of various sizes. The fibrous component 185 may be formed by the methods herein described and provided with a backing sheet 186 wherein a portion 188 of the backing sheet extends beyond the edge 189 of the assembly. Several rows of graduations or indicia indicated at 190, 191 and 192 may be printed or otherwise applied to the portion 188 of the backing sheet 186, the graduations of each row indicating severing lines or regions at which the assembly may be severed to provide an insulating section of a proper width to surround and enclose a pipe of a particular size to be insulated. For example, the graduations in the row 190 may be spaced to indicate the width of sections adapted to surround a one inch pipe, the graduations of the row 191 spaced to indicate widths of sections to surround one and one-quarter inch pipe, and the graduations of 192 spaced to indicate the widths of sections to surround one and one-half inch pipe.

While three rows of graduations 190, 191 and 192 are illustrated in FIGURE 17, it is to be understood that any number of rows of graduations indicative of widths of coverings for various pipe sizes may be applied to the portion 188 within the limits of readability. Additional rows may be printed on the opposite side of the backing sheet 186 if desired.

Through this arrangement, the fibrous mat and backing sheet assembly may be shipped in rolls to the place of installation or to a distributor, and individual sections severed from the mat assembly of widths desired for various sizes of pipe. This feature has the advantage that various sizes of pipe covering sections need not be carried in stock as any desired size of pipe covering section may be obtained by severing the section from the roll or package at the proper graduation. The backing sheet 186 may be formed of paper, metal-coated paper, cloth, glass textile or web, foil or the like. The graduations may be printed or stenciled upon the backing sheet prior to adhesively bonding the backing sheet to the fibrous component 185. The graduations may be printed upon a suitable tape and the tape glued, cemented or otherwise affixed to the backing sheet.

FIGURE 19 is illustrative of the manner of abutting the insulating sections or units in end-to-end relation as they are snapped upon a pipe 195. The insulating section indicated at 196 may be of any of the types herein disclosed wherein the backing sheet extends laterally from the insulating mat, the extending portion 188 of the backing sheet overlapping the abutting region of the adjacent insulating section or unit in the manner shown in FIGURE 19. Adhesive may be utilized to secure the overlapping portions of the backing sheets together to form a sealed joint between adjacent sections.

It is apparent that, within the scope of the invention, modifications and different arrangements may be made other than is herein disclosed, and the present disclosure is illustrative merely, the invention comprehending all variations thereof.

I claim:

1. The method of processing mineral fibers including the steps of feeding a mat of mineral fibers wherein the fibers lie generally lengthwise thereof to a compressing station, compressing the mat of fibers, retarding movement of fibers in a region of the mat adjacent one of the major faces thereof during compression whereby the fibers are reoriented to lie in generally transverse directions, adhesively joining a sheet of inextensible material to the major surface region provided by the retarded fibers of the mat of reoriented fibers while the mat is maintained in compressed condition, and removing the forces of compression whereby the fibers joined to the sheet are restrained against expansion and those fibers spaced from the sheet expanded to cause the assembly of fibers and sheet to curl.

2. The method of processing mineral fibers including the steps of advancing a mass of mineral fibers wherein the fibers extend generally lengthwise of the mass, moving the fibers adjacent opposed surface areas of the advancing mass at different speeds to reorient the fibers of the mass whereby the fibers lie in generally transverse directions, compressing the mass of reoriented fibers, joining a sheet of substantially nonstretchable material to a major face of the mass of reoriented fibers while the same is maintained in compression, and releasing the forces of compression on the mass of fibers whereby the fibers joined to the sheet are restrained against expansion while those fibers spaced from the sheet expand and distort the assembly of the fibrous mass and sheet of material into a curled configuration.

3. The method of processing mineral fibers including the steps of advancing a mass of mineral fibers, adhesively joining a first sheet of stretchable material to one major face of the mass, compressing the mass of fibers and concomitantly crimping the first sheet, joining a second sheet of substantially nonstretchable material to the other major face of the mass while the same is maintained in compression, and releasing the forces of compression whereby the fibers adjacent the stretchable sheet expand and stretch the sheet to form the assembly of the fibrous mass and sheet of material into a curled configuration.

4. The method of processing mineral fibers including the steps of advancing a mat of fibers wherein the fibers lie generally lengthwise of the mat, adhesively joining a normally crimped sheet of material in stretched condition to a major face of the advancing mat, compressing the fibers of the mat in a direction lengthwise thereof to restore the sheet to its crimped condition, moving the fibers adjacent opposed surface areas of the advancing mat at different speeds to reorient the fibers of the mat whereby the fibers lie in generally transverse directions, adhesively joining a substantially nonextensible sheet to the opposite major face of the compressed mat, and releasing the compressive forces whereby the fibers adjacent the crimped sheet expand and distort the mat into curled configuration.

5. The method of processing mineral fibers including the steps of advancing a mass of mineral fibers of mat-like configuration wherein the fibers lie in generally lengthwise directions of the mass, moving the fibers adjacent one major face of the advancing mass at a greater rate than those fibers adjacent the other major face to shift the fibers in angular directions whereby the fibers are repositioned in generally transverse directions, and adhesively joining a membrane to a major surface of the mass of repositioned fibers.

References Cited in the file of this patent

UNITED STATES PATENTS

| Number | Name | Date |
|---|---|---|
| 258,065 | Hill et al. | May 16, 1882 |
| 531,999 | Hunleth | Jan. 1, 1895 |
| 616,479 | Martin | Dec. 27, 1898 |
| 1,924,472 | Thomson | Aug. 29, 1933 |
| 2,160,001 | Saborsky | May 30, 1939 |
| 2,184,286 | Collins | Dec. 26, 1939 |
| 2,254,856 | Randall | Sept. 2, 1941 |
| 2,373,500 | Pearce | Apr. 10, 1945 |
| 2,495,636 | Hoeltzel et al. | Jan. 24, 1950 |
| 2,625,263 | Kice | Jan. 13, 1953 |
| 2,649,900 | Pfankuch | Aug. 25, 1953 |
| 2,678,686 | Schulz | May 18, 1954 |
| 2,689,811 | Frederick et al. | Sept. 21, 1954 |
| 2,778,405 | Stephens et al. | Jan. 22, 1957 |
| 2,790,464 | Stephens et al. | Apr. 30, 1957 |
| 2,906,317 | Keyes | Sept. 29, 1959 |
| 2,949,953 | Dimaio et al. | Aug. 23, 1960 |